United States Patent [19]

Ikawa

[11] Patent Number: 5,757,769
[45] Date of Patent: May 26, 1998

[54] LINE SWITCHING CONTROL SYSTEM IN SYNCHRONOUS COMMUNICATION NETWORK SYSTEM

[75] Inventor: Fumihiro Ikawa, Kawasaki, Japan

[73] Assignee: Fujitsu Limited, Kanagawa, Japan

[21] Appl. No.: 406,320

[22] Filed: Mar. 17, 1995

[30] Foreign Application Priority Data

Mar. 18, 1994 [JP] Japan ................... 6-049064

[51] Int. Cl.⁶ ......................................... H04J 1/16
[52] U.S. Cl. ............................ 370/228; 340/827
[58] Field of Search ........................ 370/216, 225, 370/228, 242, 395, 389, 907, 906, 903, 905; 340/825.01, 827; 379/221; 395/181

[56] References Cited

U.S. PATENT DOCUMENTS

| | | | |
|---|---|---|---|
| 4,680,776 | 7/1987 | Ikeuchi et al. | 375/40 |
| 4,733,320 | 3/1988 | Ikeuchi et al. | 361/67 |
| 5,307,353 | 4/1994 | Yamashita et al. | 371/11.2 |
| 5,495,472 | 2/1996 | Ohara | 370/16.1 |
| 5,504,856 | 4/1996 | Sasaoka | 395/182.01 |
| 5,587,996 | 12/1996 | Mizuno | 370/228 |

OTHER PUBLICATIONS

ITU-T Recommendation G. 707, "Synchronous Digital Hierarchy Bit Rates", Mar. 1993, pp. 1-173.
American National Standard for Telecommunications Digital Hierarchy Optical Interface Rates and Formats Specification, 1991, pp. 1-90.

*Primary Examiner*—Dang Ton
*Attorney, Agent, or Firm*—Helfgott & Karas, P.C.

[57] ABSTRACT

A line switching control system provided in each of stations connected by a first type line and a second type line in a synchronous communication network system in which frame data including an overhead is transmitted through the first type line or the second type line between the stations. The line switching control system includes a protection switching unit for switching the first type line used as a work line to the second type line defined as a protection line in a predetermined switching mode when a failure occurs in the first type line, and a unit, when the failure first type line is recovered, for transmitting line recovery mode information representing whether a line recovery mode is a REV mode in which the recovered first type line is reverted as the work line or a NON-REV mode in which the second type line is continuously used as a new work line and the recovered first type line is defined as a new protection line, the line recovery mode information being included in the overhead of the frame data.

10 Claims, 10 Drawing Sheets

| b 1 ~ 4 | SWITCHING REQUEST | NOTE |
|---|---|---|
| 1 1 1 1 | LOCKOUT OF PROTECTION | |
| 1 1 1 0 | FORCED SWITCH | |
| 1 1 0 1 | S F (HIGH PRIORITY) | ONLY 1:n STATION |
| 1 1 0 0 | S F (LOW PRIORITY) | |
| 1 0 1 1 | S D (HIGH PRIORITY) | ONLY 1:n STATION |
| 1 0 1 0 | S D (LOW PRIORITY) | |
| 1 0 0 1 | — | NOT DEFINDED |
| 1 0 0 0 | MANUAL SWITCH | |
| 0 1 1 1 | — | NOT DEFINDED |
| 0 1 1 0 | WAIT-TO-RESTORE | NOT USED IN 1+1 NON-REV MODE |
| 0 1 0 1 | — | NOT DEFINDED |
| 0 1 0 0 | EXERCISER | |
| 0 0 1 1 | — | NOT DEFINDED |
| 0 0 1 0 | REVERSE REQUEST | ONLY IN BI-DIRECTIONAL MODE |
| 0 0 0 1 | DO NOT REVERT | ONLY IN 1+1 NON-REV MODE |
| 0 0 0 0 | NO REQUEST | NOT USED IN 1+1 NON-REV MODE |

FIG. 10

```
     1+1 REV              1+1 NON-REV
     100(A)                 100(B)
       |                      |
       | K1=NR, #0            |
       | K2=#0, B1, REV       |
       |--------------------->| (1)
       |                      |
       |                      |
       | K1=DNR, #0           |
       | K2=#0, B1, NON-REV   |
   (2) |<---------------------|
       |                      |
       | K1=RR, #0            |
       | K2=#0, B1, REV       |
       |--------------------->| (3)
       |                      |
```

LINE SWITCHING CONTROL SYSTEM IN SYNCHRONOUS COMMUNICATION NETWORK SYSTEM

BACKGROUND OF THE INVENTION

(1) Field of the Invention

The present invention generally relates to a line switching control system in a synchronous communication network system such as a SONET (Synchronous Optical Network) system and a SDH (Synchronous Digital Hierarchy) system, and more particularly to a line switching control system provided in each of stations in a synchronous communication network system in which information regarding line recovery is transmitted using a predetermined byte (e.g. K-byte) in the overhead included in a bit string of a transmitted frame data.

(2) Description of the Related Art

Due to an APS (Automatic Protection Switch) function of SONET (Synchronous Optical Network) system defined by the Bellcore (Bell Communications Research), when it is detected that a failure occurs in a line used as a work line, the line is switched to a line defined as a protection line based on line switching information transmitted by use of the K-byte in the overhead of a transmitted frame data. When the failure line is recovered, a line recovery operation is performed. There are two line recovery modes: a REV (Revertive Switch) mode and a NON-REV (Non-Revertive Switch) mode. In the REV mode, when the failure line is recovered, the recovered line is reverted to the work line. In the NON-REV mode, when the failure work is recovered, the recovered line is not reverted to the work line so that the protection line is continuously used as a new work line and the recovered line is defined as a new protection line.

There are two types of bytes; a K1-byte and a k2-byte, as the K-byte used for switching control of lines in the SONET system. The K1-byte is used for an instruction of the switching operation, and the K2-byte is used for the response to the instruction (See TR-NWT-000235 and SR-NWT-001756 issued by the Bellcore).

FIGS. 1–3 show the contents of the K1-byte. Referring to FIG. 1, the K1-byte has 8 bits b1–b8. A set of the first four bits b1–b4 is assigned to a switching request, and a set of the second four bits b5–b8 is assigned to indication of a line to be switched.

The switching request indicated by the first four bits b1–b4 of the K1-byte has the contents as shown in FIG. 2. The higher the position at which the switching request is indicated in a table shown in FIG. 2, the higher the priority. The four bits b1–b4 of (1111) indicate "LOCKOUT OF PROTECTION" meaning that the switching operation is inhibited (the work line is fixed). The bits of (1110) indicate "FORCE SWITCH" meaning that the switching operation is forcingly performed. The bits of (1101) and (1100) indicate "SF (Signal Fail)" meaning signal disconnection. The bits of (1011) and (1010) indicate "SD (Signal Degrade)" meaning that the quality of signals deteriorate. The bits of (1000) indicate "Manual Switch" meaning a manual switching operation. The bits of (0110) indicate "Wait-To-Restore" meaning waiting to restore the line. The bits of (0100) indicate "Exerciser" meaning an exercising operation. The bits of (0010) indicate "Reverse Request" used in a bi-directional switching operation. The bits of (0001) indicate "Do Not Revert" means that the line is not reverted. The bits of (0000) indicate "No Request" meaning that there is no switching request.

The bits of (1001), (0111), (0101) and (0011) are not defined. The bits of (1101) indicating "SF" and the bits of (1011) indicating "SD" are applied to only a 1:n station. The 1:n station is a station in which a single protection line is prepared for n work lines. The bits of (0110) indicating "Wait-To-Restore" and the bits of (0110) indicating "No Request" are not applied to a 1+1 station having the NON-REV mode. The 1+1 station is a station in which a single protection line is prepared for a signal work line. The bits of (0001) indicating "Do Not Revert" is applied to only the 1+1 system having the NON-REV mode.

The second four bits b5–b8 of the K1-byte indicate a line to be switched as shown in FIG. 3. Referring to FIG. 3, the second four bits b5–b8 of (0000) is used when a line defined as the protection line (PTCT) is not used, when a failure occurs in a line defined as the protection line (PTCT) or when the request of the "Lockout of Protection" is supplied. The bits of (0001)–(1110) respectively identify lines to be used as work lines WK1–WK14. The bits of (1111) indicate "Extra traffic channel" meaning that signals from an external line are supplied to the protection line.

FIG. 4 shows the contents of the K2-byte. Referring to FIG. 4, the K2-byte has 8 bites b1–b8. A set of first four bits b1–b4 is assigned to a line to be switched in the same manner as the set of second four bits b5–b8 of the K1-byte described above. A fifth bit b5 in the K2-byte indicates a type of station: the 1+1 station or the 1:n station. The fifth bit b5 of "0" indicates the 1+1 station, and the fifth bit b5 of "1" indicates the 1:n station. A set of end three bits b6–b8 is assigned to a mode (MODE), provision and other information.

The first four bits b1–b4 of "0000" indicates a case where a null code (having all "0" bits) is received by use of the K1-byte. The first four bits other than (0000) indicates a line bridged to be switched.

The end three bits b6–b8 of (111) indicate "line AIS (Alarm Indication Signal)" meaning an alarm indication signal. The bits of (110) indicate "line FERF (Far End Receive Failure)" meaning that a far end receive failure has occurred. The bits of (101) indicates "bi-directional Provision" meaning that a bi-directional mode is provided as a switching mode. The bits of (100) indicates "unidirectional Provision" meaning that a unidirectional mode is provided as the switching mode. In the bi-directional mode, when a failure occurs in one of upward and downward lines (bi-directional lines) used as the work line, both the lines are switched to the protection line. In the unidirectional mode, when a failure occurs in one of upward and downward lines (the bi-directional lines) used as the work line, only the line in which the failure has occurred is switched to the protection line. The bits of (011)–(111) are prepared for nested switch operations.

In the SONET system, a communication, between stations, for control of switching the work line to the protection line and vice versa is preformed based on information of the K1-byte and the K2-byte included in the overhead of the frame data. The information indicated by the K1-byte and the K2-byte shown in FIGS. 1–4 does not include information regarding distinction between the REV mode and the NON-REV mode.

In a case where a 1+1 station having the REV mode is connected to a 1+1 station having the NON-REV mode, it is not detected that 1+1 stations having different line recovery modes are connected. Furthermore, in this case, switching operations in the respective stations are not decided.

In an SDH (Synchronous Digital Hierarchy) system defined in the CCITT, the K-byte is used in communication between stations. Thus, the SDH system has the same problems described above.

SUMMARY OF THE INVENTION

Accordingly, a general object of the present invention is to provide a novel and useful line switching control apparatus in a synchronous communication network system in which the disadvantages of the aforementioned prior art are eliminated.

A specific object of the present invention is to provide a line switching control apparatus which can detect that stations having different recovery modes are connected in a synchronous communication network system in which information regarding line recovery is transmitted using a predetermined byte in overhead of frame data.

The above objects of the present invention are achieved by a line switching control system in each of stations connected by a first type line and a second type line in a synchronous communication network system in which frame data including an overhead is transmitted through the first type line or the second type line between the stations, the line switching control system comprising: protection switching means for switching the first type line used as a work line to the second type line defined as a protection line in a predetermined switching mode when a failure occurs in the first type line; and means, when the failure first type line is recovered, for transmitting line recovery mode information representing whether a line recovery mode is a first mode in which the recovered first type line is reverted as the work line or a second mode in which the second type line is continuously used as a new work line and the recovered first type line is defined as a new protection line, the line recovery mode information being included in the overhead of the frame data.

According to the present invention, the information regarding the line recovery mode set in a station is transmitted to a remote station using the overhead included in the frame data. Thus, in the remote station, it can be determined, based on the information, whether the line recovery modes set in both the stations are matched.

Another object of the present invention is to provide a line switching control apparatus defining operations in each of stations having different recovery modes connected to each other in the synchronous communication network system.

The object of the present invention is achieved by the line switching control system as described above further comprising mode determining means for determining, based on the line recovery mode information transmitted from a remote station, whether the line recovery mode set in a station provided with the line switching control system and the line recovery mode set in the remote station are matched; and mode changing meas, when the mode determining mens determines that both the line recovery modes are mismatched, for changing the line recovery mode so that the both the line recovery mode are matched.

According to the present invention, when it is determined that the line recovery modes set in a station and a remote station are mismatched, the line recovery mode set in the station is changed so that the line recovery modes set in the both stations are matched.

BRIEF DESCRIPTION OF THE DRAWINGS

Other objects, features and advantages of the present invention will become apparent from the flowing detailed description when read in conjunction with the accompanying of drawings, in which:

FIG. 2 is a diagram illustrating contents indicated by the first four bits of the K1-byte;

FIG. 10 is a diagram illustrating operations, in a unidirectional mode, in the synchronous optical network system in which a 1+1 station having the REV mode and a 1+1 station having the NON-REV mode are connected to each other.

DESCRIPTION OF THE PREFERRED EMBODIMENTS

A description will now be given of an embodiment of the present invention.

Figure 1:
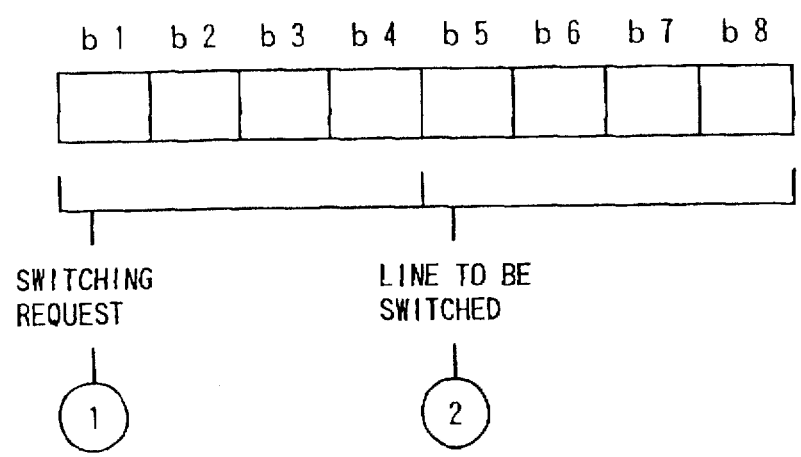
FIG. 1 is a diagram illustrating a structure of a K1-byte.
Figure 3:
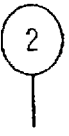
FIG. 3 is a diagram illustrating contents indicated by the second four bits of the K1-byte.
Figure 4:
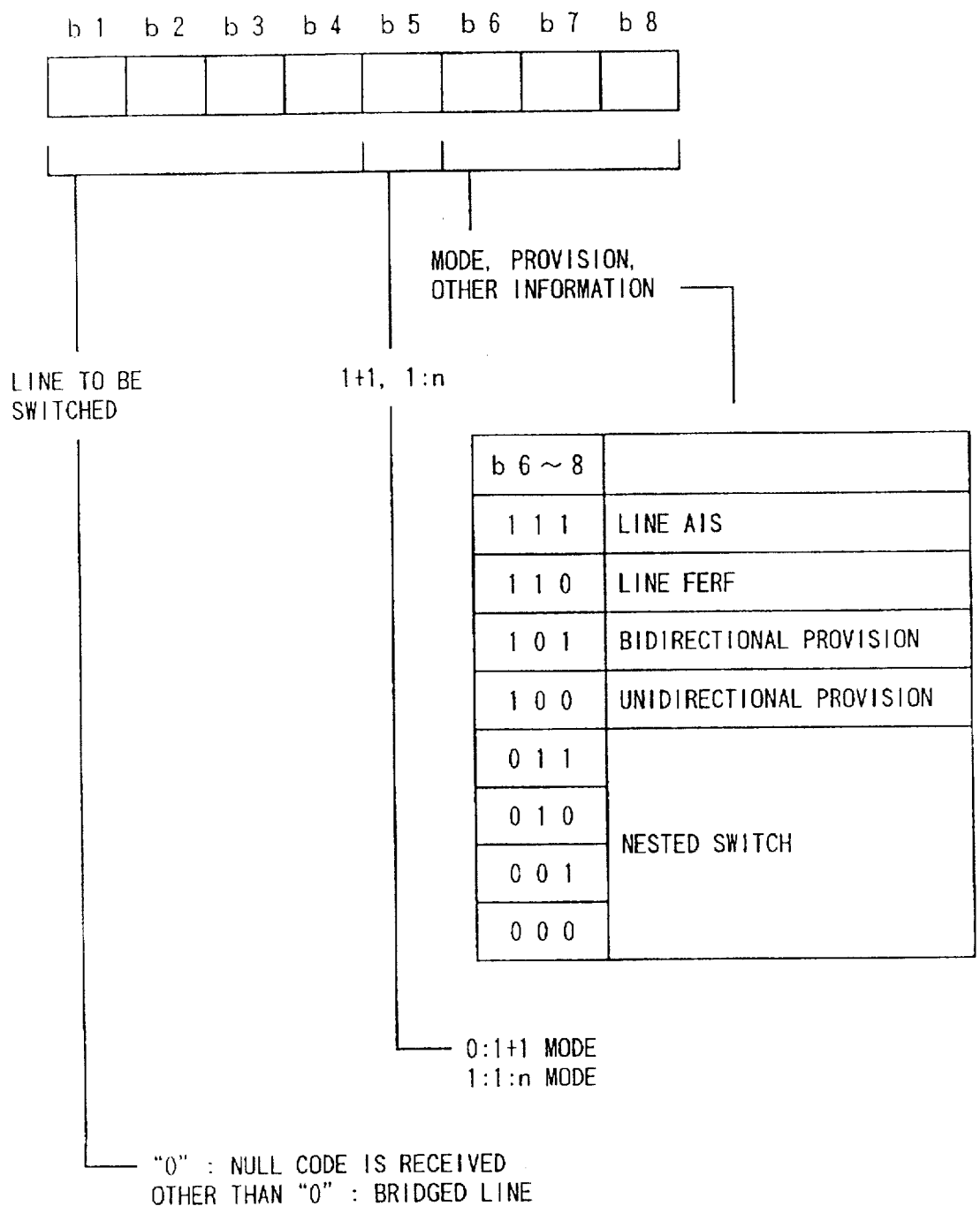
FIG. 4 is a diagram illustrating contents indicated by a K2-byte.
Figure 5:
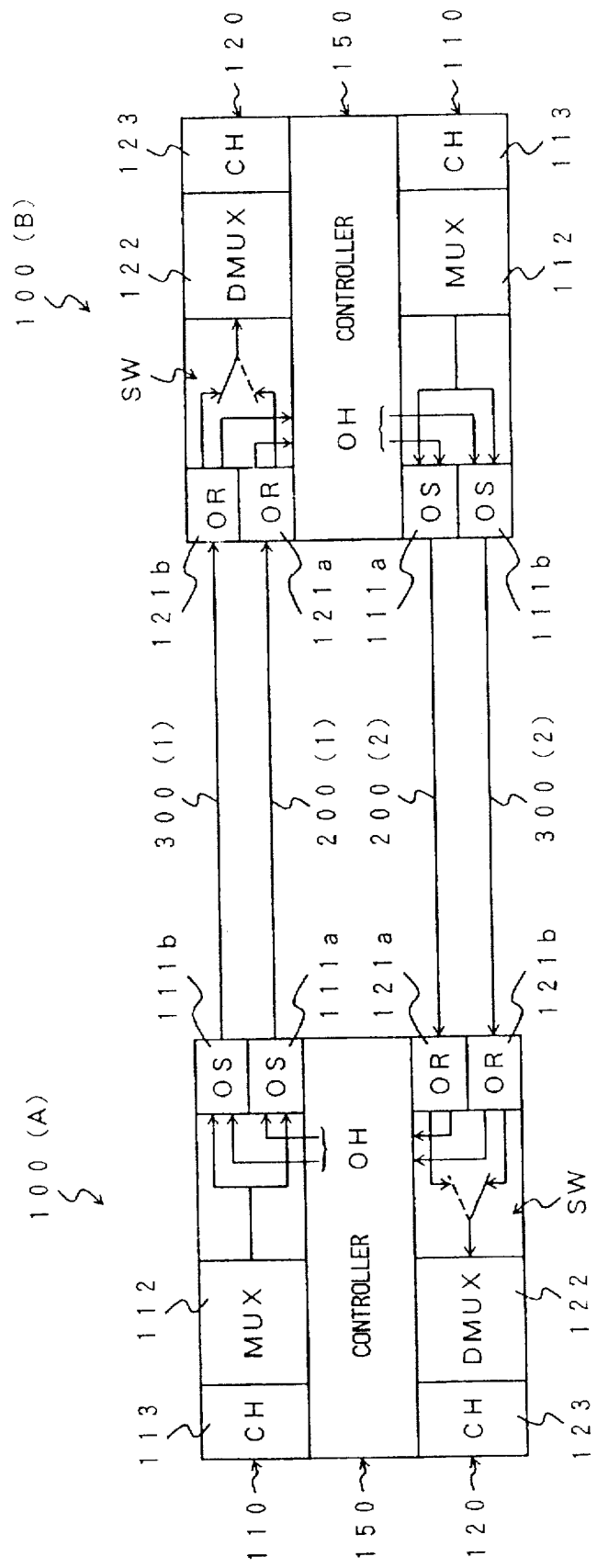
FIG. 5 is a block diagram illustrating an synchronous optical network system according to an embodiment of the present invention.

A synchronous optical network system is formed, for example, as shown in FIG. 5.

Referring to FIG. 5, a station 100(A) and a station 100(B) are connected to each other by a optical transmission path. The optical path includes a first pair of optical cable lines 200(1) and 200(2) and a second pair of optical cable lines 300(2) and 300(2). In a normal case, the first pair of optical cable lines 200(1) and 200(2) is used as the work line (WK), and the second pair of optical cable lines 300(1) and 300(2) is used as the protection line (PR).

Each of the stations 100(A) and 100(B) is a 1+1 station having a transmission system 110 and a receiving system 120. The transmission system 110 of the station 100(A) is connected to the receiving system 120 of the station 100(B) by both the optical cable line 200(1) used as the work line and the optical cable line 300(1) defined as the protection line. The transmission system 110 of the station 100(B) is connected to the receiving system 120 of the station 100(A) by both the optical cable line 200(2) used as the work line and the optical cable line 300(2) defined as the protection line.

The transmission system 110 has a first optical sender (OS) 111a, a second optical sender (OS) 111b, a multiplexer (MUX) 112 and a channel unit (CH) 113. Signals supplied via the channel unit 113 are multiplexed by the multiplexer 112. The overhead supplied from a controller 150 is added to the multiplexed signal from the multiplexer 112 so that frame data is formed. The frame data is supplied to the first optical sender 111a and the second optical sender 111b.

The receiving system 120 has a first optical receiver (OR) 121a, a second optical receiver (OR) 121b, a switching unit SW, a demultiplexer 122 and a channel unit 123. Either received data output from the first optical receiver 121a or received data output from the second optical receiver 121b is selected by the switching unit SW. The received data selected by the switching unit SW is supplied to the demultiplexer 122. The demultiplexer 122 demultiplexes the received data into a plurality of signals. The signals are output through the channel unit 123.

The first and second senders 111a and 111b of the station 100(A) optically sends the frame data through the optical cable lines 200(1) and 300(1) to the optical receivers 121a and 121b of the remote station 100(B). The first and second senders 111a and 111b of the station 100(B) optically sends the frame data through the optical cable line 2000(2) and 300(2) to the optical receivers 121a and 121b of the remote station 100(A).

Figure 6:
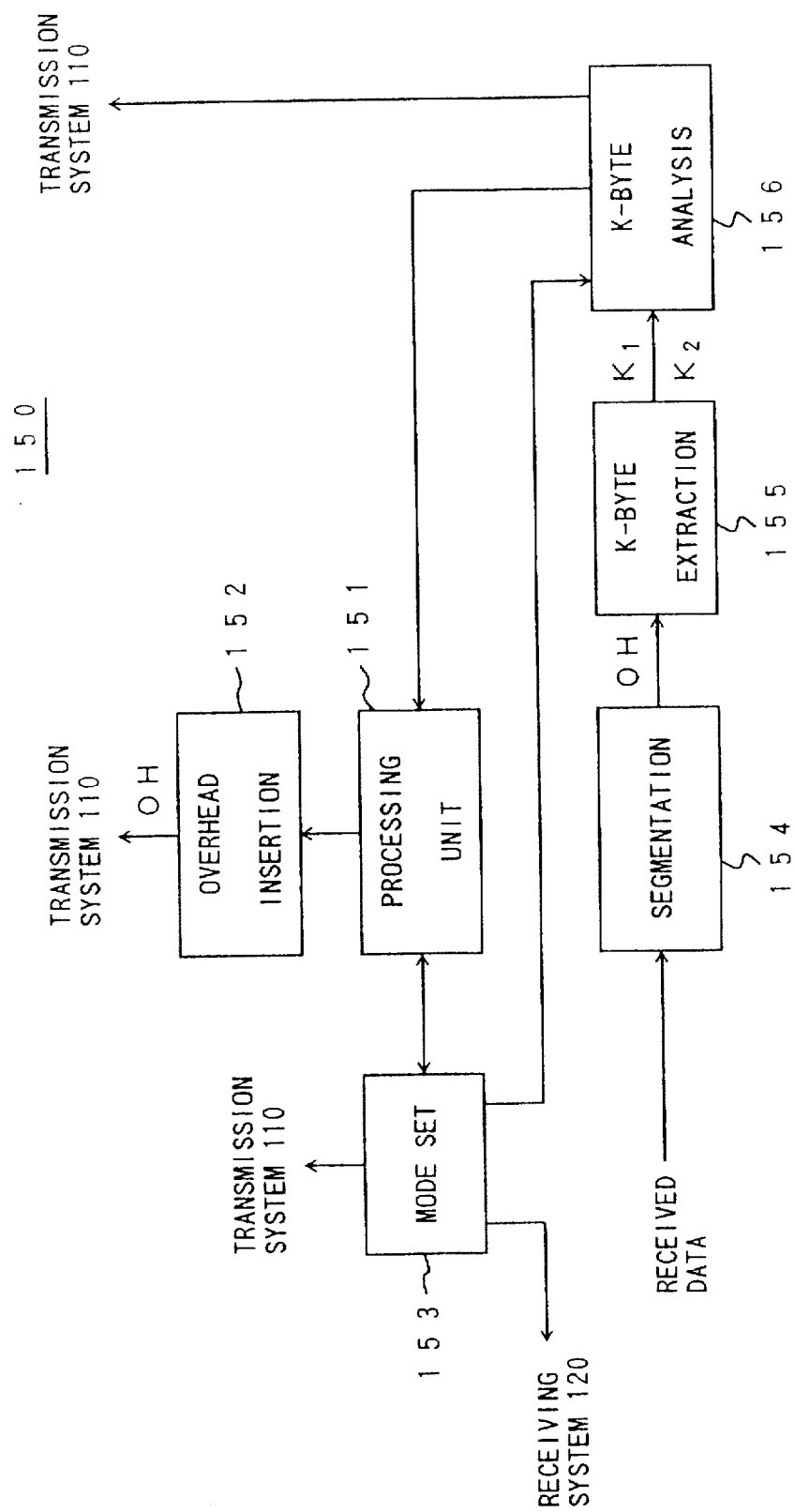
FIG. 6 is a block diagram illustrating a structure of a control unit of a receiving system in each station shown in FIG. 5.

Each of the stations 100(A) and 100(B) has a controller 150. The controller 150 is formed as shown in FIG. 6. Referring to FIG. 6, the controller 150 has a processing unit 151, an overhead insertion unit 152, a mode setting unit 153, a segmentation unit 154, a K-byte extraction unit 155 and a K-byte analysis unit 156.

The overhead insertion unit 152 outputs the overhead (OH) which is information required for operations and management in the synchronous optical network system. The overhead (OH) is added to the multiplexed signal so that the frame data is formed. The overhead (OH) incudes the K1-byte and K2-byte described above. The mode setting unit 153 sets various modes in which operations are carried out in the transmission system 110 and the receiving system 120. The modes to be set includes the REV/NON-REV mode, the bi-directional/unidirectional mode and the 1+1/ 1:N mode (in this embodiment, the 1+1 mode is set). The transmission system 110 and the receiving system 120 are informed of the modes set in the mode setting unit 153.

The segmentation unit 154 segments the received data into the overhead and another part. The overhead obtained by the segmentation unit 154 is supplied to the K-byte extraction unit 155. The K-byte extraction unit 155 extracts the K1-byte and K2-byte from the overhead. The K1-byte and the K2-byte are supplied to the K-byte analysis unit 156. The K-byte analysis unit 156 detects the switching instruction based on the K1-byte, and detects the response to the switching instruction based on the K2-byte. The K-byte analysis unit 156 further detects, based on the K2-byte, whether various modes in this station are matched with those in the remote station.

Figure 7:
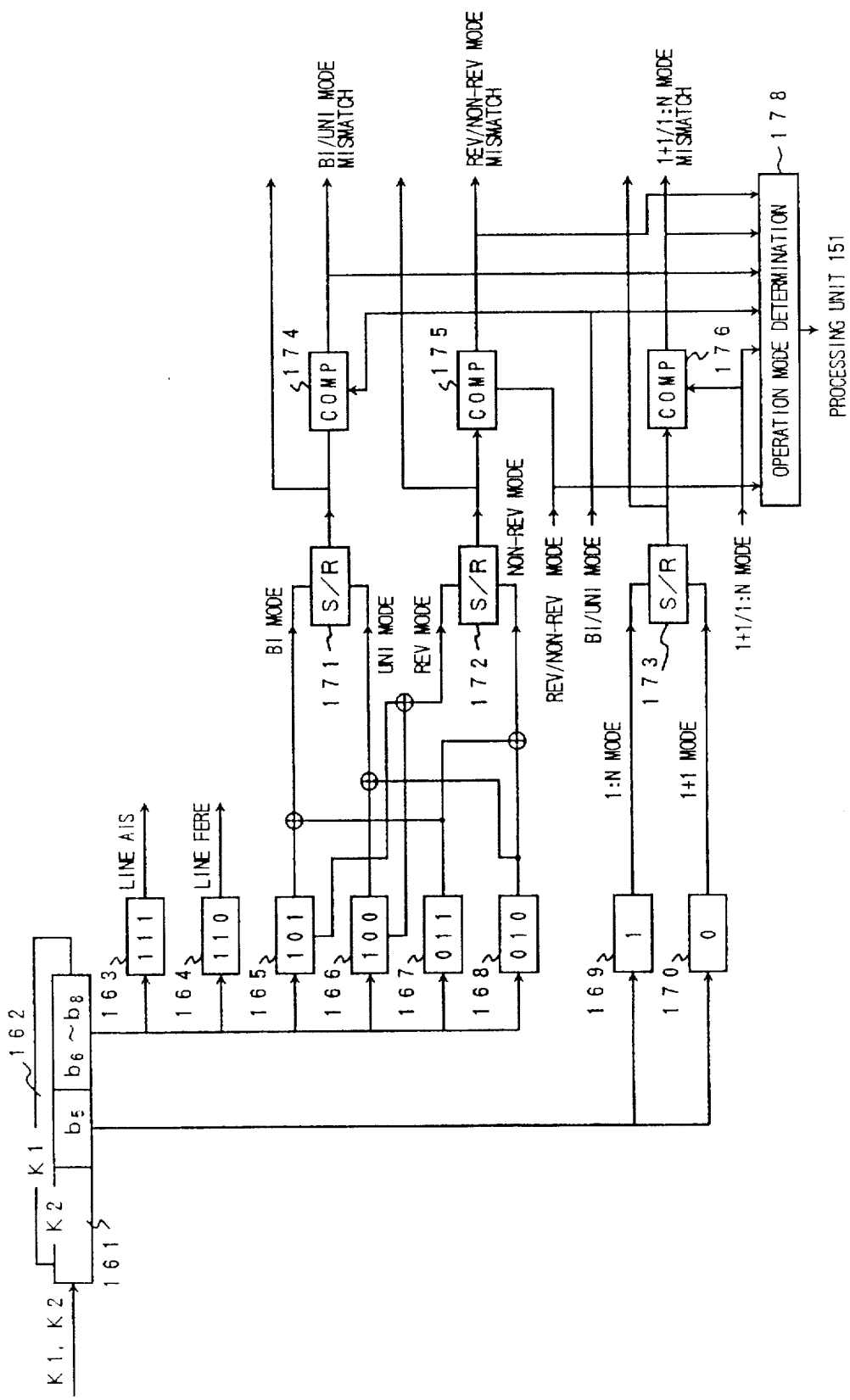
FIG. 7 is a block diagram illustrating a structure of a K-byte processing unit of the control unit shown in FIG. 6.

The K-byte analysis unit 156 has a structure as shown in FIG. 7. Referring to FIG. 7, the K-byte analysis unit 156 has a K2-byte register 161, a K1-byte register 162, a 111-detector 163, a 110-detector 164, a 101 detector 165, a 100-detector 166, a 011-detector 167, a 010-detector 168, a 1-detector 169 and a 0-detector 170. The K-byte analysis unit 156 further has S/R latches 171, 172 and 173, comparators 174, 175 and 176 and an operation mode determination unit 178.

The K2-byte and the K1-byte supplied from the K-byte extraction unit 155 are respectively set in the K2-byte register 161 and the K1-byte register 162. The end three bits b6–b8 of the K2-byte set in the K2-byte register 161 is supplied to the 111-detector 163, the 110-detector 164, the 101-detector 165, the 100-detector 166, the 011-detector 167 and the 010-detector 168. The fifth bit b5 of the K2-byte set in the K2-byte register 161 is supplied to the 1-detector 169 and the 0-detector 170.

Figure 8:
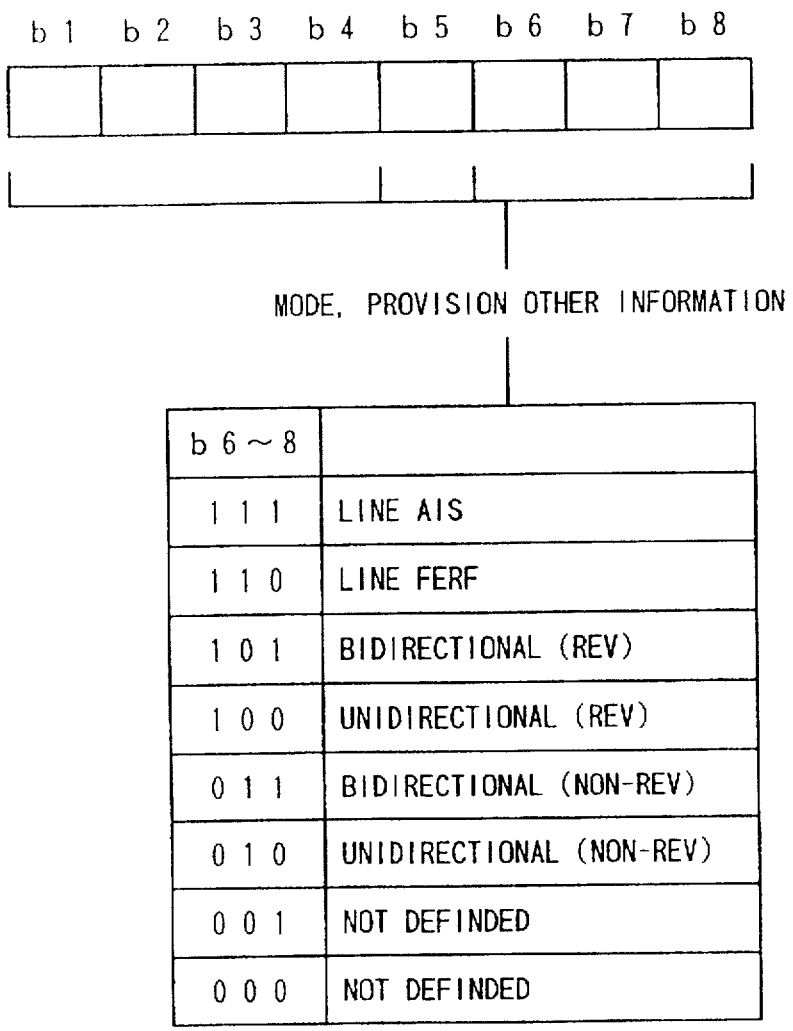
FIG. 8 is a diagram illustrating contents indicated by the end three bits of the K2-byte in the embodiment of the present invention.

In this embodiment, the end three bits b6–b8 of the K2-byte represents the mode, the provision and other information as shown in FIG. 8.

When the end three bits b6–b8 of the K2-byte are 111, the 111-detector 163 outputs an active signal as the AIS (Alarm Indication Signal). When the bits b6–b8 are 110, the 110-detector 164 outputs an active signal as a signal representing the FERF (Far End Receive Failure) signal. When the bits b6–b8 are 101, the 101-detector 165 outputs an active signal representing the bi-directional (BI) mode and the REV mode. When the bits b6–b8 are 100, the 100-detector 166 outputs an active signal representing the unidirectional (UNI) mode and the REV mode. When the bits b6–b8 are 011, the 011-detector outputs an active signal representing the bi-directional (BI) mode and the NON-REV mode. When the bits b6–b8 are 010, the 010-detector 168 outputs an active signal representing the unidirectional (UNI) mode and the NON-REV mode.

A logical OR ($\oplus$) signal of output signals of the 101-detector 165 and the 011-detector 167 is supplied to a set terminal (S) of the S/R latch 171. Thus, in a case where the switching mode is the bi-directional mode (see FIG. 8), the S/R latch 171 is set in an active state. A logical OR ($\oplus$) signal of outputs signals of the 100-detector 166 and the 010-detector 168 is supplied to a reset terminal (R) of the S/R latch 171. Thus, in a case where the switching mode is the unidirectional mode (see FIG. 8), the S/R latch 171 is reset. A logical OR ($\oplus$) signal of outputs signals of the 101-detector 165 and the 100-detector 166 is supplied to a set terminal (S) of the S/R latch 172. Thus, in a case where the line recovery mode is the REV mode (see FIG. 8), the S/R latch 172 is set in an active state. A logical OR ($\oplus$) signal of outputs signals of 011-detector 167 and the 010-detector 168 is supplied to a reset terminal of the S/R latch 172. Thus, in a case where the line recovery mode is the NON-REV mode (see FIG. 8), the S/R latch 172 is reset.

The comparator 174 compares the a logical sate set in the R/S latch 171 with a logical state representing the switching mode (either bi-directional mode or the unit-directional mode) set in this station. If these logical states are not equal to each other, the comparator 174 outputs a mismatch detecting signal representing that the switching modes (the bi-directional mode and the unidirectional mode) in this station and the remote station are mismatched.

The comparator 175 compares a logical state set in the R/S latch 172 with a logical state representing the line recovery mode (either the REV mode or the NON-REV mode) set in this station. If these logical states are not equal to each other, the comparator 175 outputs a mismatch detecting signal representing that the line recovery modes (the REV mode and the NON-REV mode) in this station and the remote station are mismatched.

When the fifth bit b5 of the K2-byte set in the K2-byte register 161 is "1", the 1-detector 169 outputs an active signal representing the 1:N mode (the 1:N station). When the fifth bit b5 of the K2-byte is "0", the 0-detector 170 outputs an active signal representing the 1+1 mode (the 1+1 station). The output signal of the 1-detector 169 is supplied to a set terminal of the R/S latch 173. The output signal of the 0-detector 170 is supplied to a reset terminal of the R/S latch 173. Thus, in the 1:N mode, the S/R latch 173 is set in an active state. On the other hand, in the 1+1 mode, the S/R latch 173 is reset.

The comparator 176 compares a logical state set in the S/R latch 173 with a logical state representing a type of this station (either the 1:N mode or the 1+1 mode). If these states are not equal to each other, the comparator 176 outputs a mismatch detecting signal representing that types of this station and the remote station are mismatched.

The output signals of the comparators 174, 175 and 176 and the mode signals set in the mode setting unit 153 of this station are supplied to the operation mode determination unit 178. The operation mode determination unit 178 determines, based on the signals, in which modes this station is operated, and a determination result is supplied to the processing units 151.

Figure 9:
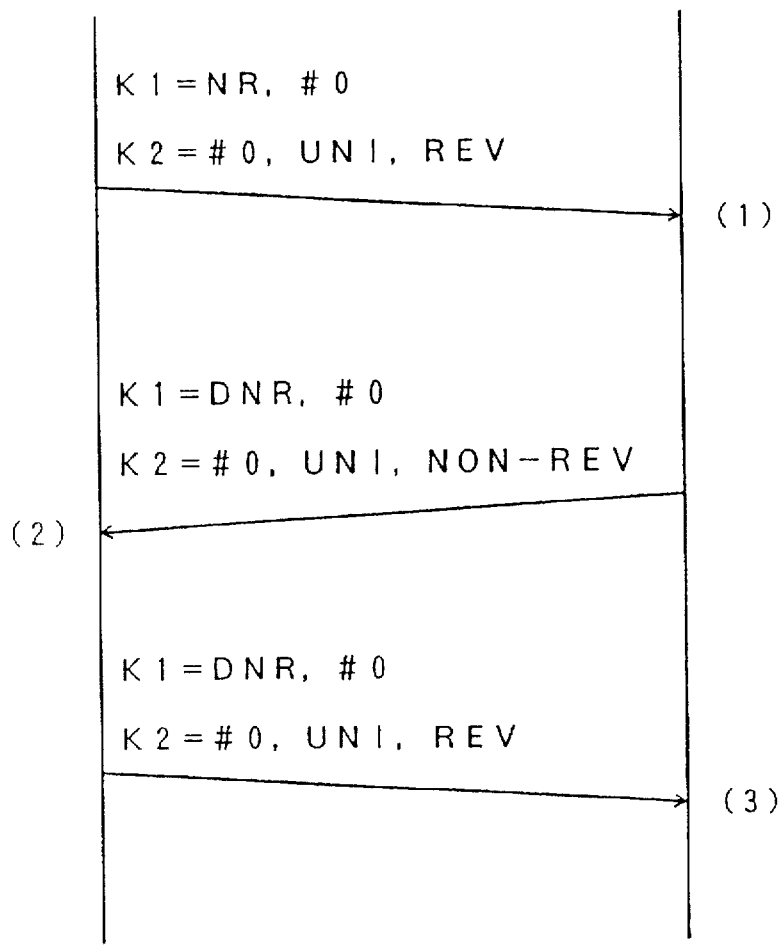
FIG. 9 is a diagram illustrating operations, in a bi-directional mode, in the synchronous optical network system in which a 1+1 station having the REV mode and a 1+1 station having the NON-REV mode are connected to each other.

In a case where the REV mode and the unidirectional mode (UNI) are set in the 1+1 station 100(A) and the NON-REV mode and the unidirectional mode (UNI) are set in the 1+1 station 100(B), operations between the stations 100(A) and 100(B) are performed in accordance with a procedure as shown in FIG. 9.

(1) For example, the K1-byte including NR "0000" (see FIG. 2) and #0 identifying the work line and the K2-byte including #0 and bits "100" representing the unidirectional mode (UNI) and the REV mode (see FIG. 8) are transmitted from the station 100(A) to the station 100(B). In this case, in the station 100(B), it is detected, based on the mismatch detecting signal from the comparator 175, that the NON-REV mode set in this station 100(B) and the REV mode set in the remote station 100(A) are mismatched. Since the NR "0000" is an invalid code for the station in which the NON-REV mode is set, the station 100(B) generates a PSBF (Protection Switching Byte Fail) signal.

(2) The station 100(B) recognizes that the PSBF signal has been generated caused by the mismatch of the NON-REV mode set in this station 100(B) and the REV mode set in the remote station 100(A). The station 100(B) sends to the station 100(A) the K1-byte including the DNR "0001" (see FIG. 2) and #0 and the K2-byte including #0 and bits "010" representing the unidirectional mode (UNI) and the NON-REV mode (see FIG. 8). In this case, in the station 100(A), it is detected, based on the mismatch detecting signal from the comparator 175, that the REV mode set in this station 100(A) and the NON-REV mode set in the remote station 100(B) are mismatched. The processing unit 151 which receives the detecting result supplies an instruction to the mode setting unit 153 so that the mode setting unit 153 changes the line recovery mode set therein from the REV mode to the NONREV mode.

(3) After this, the station 100(A) sends to the station 100(B) the K1-byte including the DNR code "0001" (see FIG. 2) and #0 and the K2-byte including #0 and the bits "100" representing the unit-directional mode (UNI) and the REV mode (see FIG. 8). In this case, in the station 100(B), it is detected, based on the output of the comparator 175, that the line recovery mode set in this station 100(B) and that set in the remote station 100(A) are mismatched (the REV mode). Since the DNR code "0001" included in the K1-byte is a valid code for the station in which the NON-REV mode is set, the PSBF signal is turned off in the station 100(B).

According to the operations performed in accordance with the above procedure, both the stations 100(A) and 100(B) become in the same sate where the NON-REV mode is set as the line recovery mode. The line switching operation is performed in accordance with the unidirectional mode and the line recovery operation is then performed in accordance with the NON-REV mode, in both the stations 100(A) and 100(B).

In a case where the REV mode and the bi-directional mode (BI) are set in the 1+1 station 100(A) and the NON-REV mode and the bi-directional mode (BI) are set in the 1+1 station 100(B), operations between the stations 100(A) and 100(B) are performed in accordance with a procedure as shown in FIG. 10.

(1) For example, the K1-byte including NR "0000" (see FIG. 2) and #0 identifying the work line and the K2-byte including #0 and bits "101" representing the bi-directional mode (BI) and the REV mode (see FIG. 8) are transmitted from the station 100(A) to the station 100(B). In this case, in the station 100(B), it is detected, based on the mismatch detecting signal from the comparator 175, that the NON-REV mode set in this station 100(B) and the REV mode set in the remote station 100(A) are mismatched. Since the NR code "0000" is an invalid code for the station in which the NON-REV mode is set, the station 100(B) generates the PSBF (Protection Switching Byte Fail) signal.

(2) The station 100(B) recognizes that the PSBF signal has been generated caused by the mismatch of the NON-REV mode set in this station 100(B) and the REV mode set in the remote station 100(A). The station 100(B) sends to the station 100(A) the K1-byte including the DNR "0001" (see FIG. 2) and #0 and the K2-byte including #0 and bits "011" representing the bi-directional mode (BI) and the NON-REV mode (see FIG. 8). In this case, in the station 100(A), it is detected, based on the mismatch detecting signal from the comparator 175, that the REV mode set in this station 100(A) and the NON-REV mode set in the remote station 100(B) are mismatched. The processing unit 151 which receives the detecting result supplies an instruction to the mode setting unit 153 so that the mode setting unit 153 changes the line recovery mode from the REV mode to the NON-REV mode.

(3) After this, the station 100(A) sends to the station 100(B) the K1-byte including the RR code "0010", (see FIG. 2) and #0 and the K2-byte including #0 and the bits "101" representing the bi-directional mode (BI) and the REV mode (see FIG. 8). In this case, in the station 100(B), it is detected, based on the output of the comparator 175, that the recovery mode set in this station 100(B) and that set in the remote station 100(A) are mismatched (the REV mode). Since the RR code "0010" included in the K1-byte is a valid code for the station in which the bi-directional mode is set, the PSBF signal is turned off in the station 100(B).

Hence, both the stations 100(A) and 100(B) become in the same sate where the NON-REV mode is set. The line switching operation is performed in accordance with the bi-directional mode and the line recovery operation is then performed in the NON-REV mode, in both the stations 100(A) and 100(B).

According to the above embodiment, since the information indicating which line recovery mode is set either the REV mode or the NON-REV mode in a first station is transmitted to a second station, the second station can detects, based on the information, whether the line recovery mode set in the second station and that set in the first station are matched. In addition, in a case where it is detected that the line recovery modes set in the both stations are mismatched, the recovery mode set in one of the stations are changed so that the recovery modes in both the station are matched.

The present invention is not limited to the aforementioned embodiments, and variations and modifications may be made without departing from the scope of the claimed invention.

What is claimed is:

1. A line switching control system in each of stations connected by a first type line and a second type line in a synchronous communication network system in which frame data including an overhead is transmitted through the first type line or the second type line between the stations, said line switching control system comprising:

protection switching means for switching the first type line used as a work line to the second type line defined as a protection line in a predetermined switching mode when a failure occurs in the first type line; and means, when the failure first type line is recovered, for transmitting line recovery mode information representing whether a line recovery mode is a first mode in which the recovered first type line is reverted as the work line or a second mode in which the second type line is continuously used as a new work line and the recovered first type line is defined as a new protection line, the line recovery mode information being included in the overhead of the frame data.

2. The line switching control system as claimed in claim 1, wherein said synchronous communication network system is either a synchronous optical network (SONET) system defined by the Bellcore or a synchronous digital hierarchy (SDH) system defined by the CCITT.

3. The line switching control system as claimed in claim 2, wherein the line recovery mode information is represented by K2-byte included in the overhead of the frame data.

4. The line switching control system as claimed in claim 3, wherein the line recovery mode information is represented by using end three bits of the K2-byte.

5. The line switching control system as claimed in claim 4, wherein the predetermined switching mode set in said protection switching means is selected from a bi-directional mode in which both bi-directional lines forming the first type line are switched to the second type line and a unidirectional mode in which only one of the bi-directional lines in which one the failure has occurred is switched to the second type line, and wherein the end three bits of the K2-byte represents one of four states:

a first state where the unidirectional mode and the first mode are respectively set as the switching mode and the line recovery mode;

a second state where the unidirectional mode and the second mode are respectively set as the switching mode and the line recovery mode;

a third state where the bi-directional mode and the first mode are respectively set as the switching mode and the line recovery mode; and a fourth state where the bi-directional mode and the second mode are respectively set as the switching mode and the line recovery mode.

6. The line switching control system as claimed in claim 1 further comprising:

mode determining means for determining, based on the line recovery mode information transmitted from a remote station, whether the line recovery mode set in a station provided with said line switching control system and the line recovery mode set in said remote station are matched; and mode changing means, when said mode determining means determines that both the line recovery modes are mismatched, for changing the line recovery mode so that the both the line recovery mode are matched.

7. The line switching control system as claimed in claim 6, wherein said synchronous communication network system is either a synchronous optical network (SONET) system defined by the Bellcore or a synchronous digital hierarchy (SDH) system defined by the CCITT.

8. The line switching control system as claimed in claim 7, wherein the line recovery mode information is represented by K2-byte included in the overhead of the frame data.

9. The line switching control system as claimed in claim 8, wherein the line recovery mode information is represented by using end three bits of the K2-byte.

10. The line switching control system as claimed in claim 9, wherein the predetermined switching mode set in said protection switching means is selected from a bi-directional mode in which both bi-directional lines forming the first type line are switched to the second type line and a unidirectional mode in which only one of the bi-directional lines in which one the failure has occurred is switched to the second type line, wherein the end three bits of the K2-byte represents one of four states:

a first state where the unidirectional mode and the first mode are respectively set as the switching mode and the line recovery mode;

a second state where the unidirectional mode and the second mode are respectively set as the switching mode and the line recovery mode;

a third state where the bi-directional mode and the first mode are respectively set as the switching mode and the line recovery mode; and a fourth state where the bi-directional mode and the second mode are respectively set as the switching mode and the line recovery mode, and wherein said mode determining means has:

first means for detecting the line recovery mode set in the remote station based on one of the four state represented by the K2-byte; and second means for comparing the line recovery mode detected by said first means and the line recovery mode set in the station provided with said line switching control system, it being determined, based on a result obtained by said second means, whether the both line recovery mode are matched.

* * * * *